Nov. 17, 1942.　　　H. VON TAVEL　　　2,302,358
REGULATING DEVICE FOR FUEL INJECTION APPARATUS
Filed Sept. 18, 1941　　　2 Sheets-Sheet 1
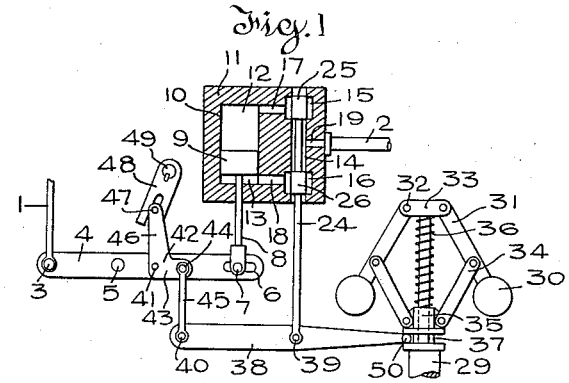
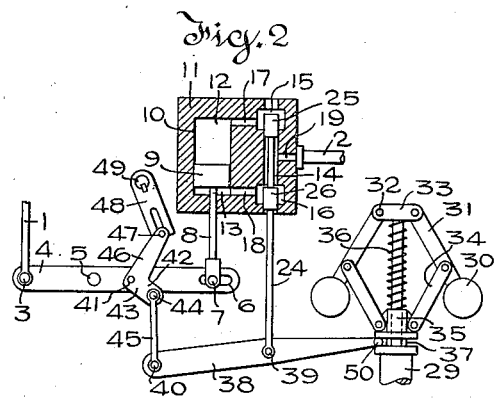
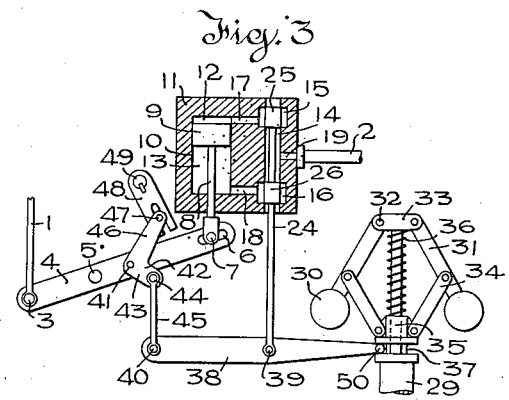
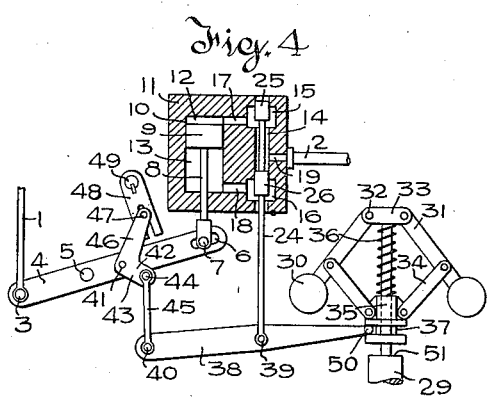
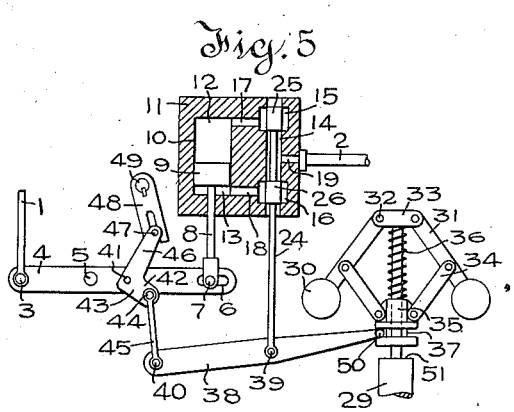
Inventor
Hesper Von Tavel
By Dodge and Im
Attorneys Nov. 17, 1942.  H. VON TAVEL  2,302,358

REGULATING DEVICE FOR FUEL INJECTION APPARATUS

Filed Sept. 18, 1941  2 Sheets—Sheet 2

Inventor
Hesper Von Tavel
By
Attorneys

Patented Nov. 17, 1942

2,302,358

UNITED STATES PATENT OFFICE 2,302,358

REGULATING DEVICE FOR FUEL INJECTION APPARATUS

Hesper von Tavel, Geneva, Switzerland

Application September 18, 1941, Serial No. 411,397
In Switzerland September 23, 1940

4 Claims. (Cl. 121—42)

The present invention relates to a regulating device for fuel injection apparatus of the type having a servomotor-controlled energy input controller and a slide valve for the control of said servomotor, the operating member of said valve being controlled by a governor responsive to variations in the speed and being further displaceable by any source of power, i. e., by the action of the attendant and capable of returning automatically to its normal working position.

In known regulating devices of this class the governor sleeve is subjected to the action of a spring and positively coupled with the operating member of the valve. In order to change the position of the regulating organ for varying the quantity of fuel injected, the operating member of the valve must be displaced indirectly by changing the spring tension on the governor sleeve. This arrangement obviously requires a considerable amount of energy especially in the case of effective governors, so as to delay the displacement of the energy input controller. Moreover, every displacement operated from the outside will produce a certain shifting of the governor sleeve as well as of the parts of the governor coupled with said sleeve, the result being undesired oscillations of the whole system. Such inconveniences are especially perceptible on regulating devices of motor vehicles operating almost with frequent and rapid displacements and long shiftings of the energy input controller.

The invention has for its object to obviate the above and like defects and to provide an improved regulating device of this general type which will operate satisfactorily over a wide speed range and whose operation will be unaffected by oscillations.

Another object of the invention is to provide a regulating device having relatively few and simple parts which take up less floor space than known arrangements and which are inexpensive to manufacture and install.

To this end, the regulating devices of the above type according to the present invention comprises a regulating lever which is mounted for rocking movement about a fixed axis and connected with the energy input controller to be operated as well as with the reciprocable piston of the servomotor, and a floating control lever connected to the operating member of the slide valve which controls the servomotor and articulated, on the one side, to the governor sleeve and, on the other side, by means of an adjustably guided motion combining element to the said regulating lever.

The adjustable motion combining element interposed between the regulating lever and the floating control lever is preferably composed of a link pivoted to the control lever and an intermediate piece rockingly mounted on the regulating lever and pivoted to said link, one end of said piece being guided along a path whose position is adjustable from the outside, for instance, by turning the guide member about an axis extending perpendicularly to the plane of said path.

In order to obtain a compact arrangement of the parts of the regulating device, the axis of rotation of the guide path is preferably made coincident with the pivot axis of the regulating lever, said lever being mounted for instance on a shaft serving angularly to adjust the said guide path; moreover, the pivot between the link and intermediate piece of the adjustable motion combining element is preferably made in the form of an annular eccentric journal to provide a passage for said shaft.

Further according to the invention, a preferred arrangement is one in which the joint between the regulating lever and the adjustable motion combining element is formed by an eccentric fast on the regulating lever and having a working surface which surrounds the pivot axis of said lever.

Finally, the overall dimensions of the regulating device may be diminished also by arranging the directions of displacement of the reciprocable piston of the servomotor and the operating member of the control valve perpendicularly to one another so that the regulating lever and control lever are positioned on different sides of the servomotor casing extending at right angles from each other.

In the accompanying drawings are represented schematically two embodiments of the invention.

Figs. 1 to 5 show a regulating device according to the first embodiment, the parts thereof being represented in five different positions.

Likewise, Figs. 7 to 16 illustrate parts of said second embodiment in five different positions, whereby views arranged side by side are supposed to represent the same position.

Figure 6:
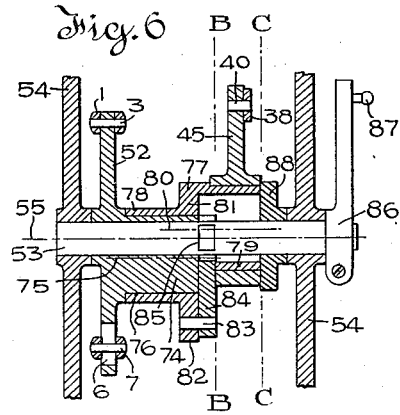
Fig. 6 is a sectional view taken on the line A—A in Fig. 7, showing parts of a regulating device according to the second embodiment.

Figs. 7, 9, 11, 13 and 15 are sectional views taken on the line B—B of Fig. 6 and Figs. 8, 10, 12, 14 and 16 are sectional views taken on the line C—C in Fig. 6.

In the embodiment according to Figs. 1 to 5 the numeral 1 designates a longitudinally displaceable rod which typifies the energy input controller of a prime mover or engine. The engine proper is not represented in the drawings; it might, for example, be an internal combustion engine adapted to drive a motor vehicle and having a cylinder into which the fuel is injected by means of a pump. The quantity of fuel injected by said pump depends upon the position of the rod 1 which thus serves to regulate the output of the engine.

The regulating device may be so constructed as to enable the operator to adapt the speed of the vehicle to the circumstances of the time table as well as to the conditions of the road simply by displacing the regulating rod 1. Besides the regulating device is intended to automatically prevent the engine from exceeding a predetermined speed.

The displacement of the rod 1 may be effected by fluid pressure rather than by the regulating power or the power exerted by the operator, said pressure fluid being supplied to the device through a piping 2 by means of a pump not represented in the drawings.

The regulating rod 1 is pivoted by means of a pivot 3 to one end of a regulating lever 4 which is itself rockingly mounted on a pin 5, said pin being stationary relatively to the frame or casing not shown of the device. The other end of the regulating lever 4 is connected by means of a pin 7 engaging a longitudinal slot 6 of said lever to a rod 8 carrying the reciprocable piston 9 of a servomotor. Said piston operates with a tight fit in a cylinder 10 formed in the casing 11 of the servomotor and it separates two working spaces 12 and 13 in said cylinder.

Parallel to the cylinder 10 is disposed a valve cylinder 14 formed in the casing 11 and communicating at both ends with the atmosphere, said valve cylinder is enlarged as at 15 and 16 to provide two chambers. The chamber 15 communicates through a passage 17 with the working space 12, while the chamber 16 is shown communicating through a passage 18 with the working space 13 of the cylinder 10. Moreover, the middle portion of the valve cylinder 14 is shown connected by means of a lateral passage 19 with the fluid pressure supply piping 2. In the valve cylinder 14 operates a tail rod 24 having thereon two pistons 25 and 26; the length of said pistons and the distance therebetween correspond exactly to the length and distance of the chambers 15 and 16, respectively, and their diameter is so determined as to permit sliding of said pistons with a tight fit in those spaces of the cylinder 14 which are disposed on either side of the chambers 15 and 16.

On a shaft 29 which is driven by the engine is mounted a centrifugal governor having its flyweights 30 secured to bars 31 pivoted on pins 32 of a support 33 fast on the shaft 29. The bars 31 are connected by means of links 34 with a governor sleeve 35, which is longitudinally displaceable on the shaft 29 and subjected to the action of a pressure spring 36 bearing against the support 33.

The governor sleeve 35 is provided with a groove 37 engaging the end 50 of a floating control lever 38 in such way as to cause said end to always follow the longitudinal displacement of said sleeve along the shaft 29 without, however, partaking of the rotation thereof. The control lever 38 presents intermediate its length a pin 39 to which is articulated the tail rod 24 of the slide valve. Another pin 40 carried by the control lever 38 is connected by means of a motion combining element with a pin 41 provided on the regulating lever 4.

This motion combining element comprises a bell-crank lever 42 journaled on the said pin 41. One arm 43 of said lever carries a pin 44 connected by means of a link 45 with the said pin 40 on the control lever 38. On the other arm 46 of the bell-crank lever 42 is provided a pin 47 engaging a guide fork 48 keyed to a shaft 49, the axis of said shaft extending perpendicularly to the plane of the path along which moves pin 47 guided by the fork 48. The shaft 49 may be supported in any known manner (not shown) in the frame or casing of the device so as to turn about its axis when operated by the operator.

Fig. 1 shows the device in the position of rest. Owing to the pressure of the spring 36 the sleeve 35 of the centrifugal governor bears against the shoulder 51 on the shaft 29 so long as the flyweights 30 are not subjected to centrifugal force. The piston 9 of the servomotor then occupies its lower end position in the working space 13 and thereby acts through the regulating lever 4 upon the regulating rod 1 to hold the same in a position wherein delivery of fuel to the engine is nearly interrupted. The position of the pin 41 fast on the regulating lever 4 is determined by the position of the piston 9 of the servomotor. Moreover, the shaft 49 which is operable from outside is now so positioned as to hold the operating member 24 of the control valve in its midposition by the intermediary of the fork 48, bell-crank lever 46, link 45 and control lever 38. In said mid-position, the pistons 25 and 26 extend over the whole length of the chambers 15 and 16 so as to shut off to the same degree the fluid pressure supply from the piping 2 into the said chambers as well as through the passages 17 and 18 into the working spaces 12 and 13 respectively. Also escape of fluid under pressure from said working spaces, passages and chambers through the open ends of the valve cylinder 14 is shut off in like manner on both sides of the piston 9.

To start the engine, fluid pressure must be supplied through piping 2 in any known manner which need not be described in detail. Further the shaft 49 is to be turned by the operator so as to bring the guide fork 48 into the position shown in Fig. 2. The bell-crank lever 42 is then pivoted about the pin 41 and thereby causes through the link 45 a rocking of the control lever 38 about its end 50 which is held in the groove 37 of the governor sleeve 35. The tail rod 24 of the control valve is thus brought into a position wherein the piston 25 establishes communication between the chamber 15 and the adjacent open end of the cylinder 14 while, simultaneously, communication between the chamber 15 and the intermediate portion of the cylinder 14, into which opens passage 19 is interrupted. At the same time the piston 26 releases communication between said intermediate cylinder portion and the chamber 16 and simultaneously tightly closes the passage between said chamber and the adjacent open end of the cylinder 14.

Consequently fluid under pressure flows from the supply piping 2 through the intermediate portion of the cylinder 14, chamber 16 and passage 18 into the working space 13 while, simultaneously, fluid is allowed to escape from the working space 12 through passage 17, chamber 15 and the adjacent open end of the cylinder 14. The piston 9 influenced by the difference of pressure is then displaced toward the working space 12 thereby causing by means of the rod 8 a rocking of the regulating lever 4 about the fixed pin 5. The regulating rod 1 is thus brought into a position wherein fuel is supplied the engine (Fig. 3). The rocking of the regulating lever 4 causes also displacement of the pin 41 and, consequently, a displacement of the whole bell-crank lever 42, the pin 47 thereof sliding on the guide fork 48. Further, the link 45 acts upon the control lever 38 to turn the same back about its end 50 held in the groove 37 of the governor sleeve 35, whereby the operating member 24 of the control valve is returned to its mid-position. In this position the one-sided supply of fluid pressure to the working space 13, as well as the escape of fluid from the working space 12 are stopped, and the piston 9, the regulating lever 4 and the regulating rod 1 are arrested in a position determined by the position of the shaft 49. The engine thus receives a certain amount of fuel permitting to attain a determined effective output and also a determined speed depending upon the torque required.

It will be seen that when the speed of the engine exceeds a certain limit, the centrifugal force acting upon the flyweights 30 will suffice to overcome the initial tension of the spring 36 applied against the sleeve 35. The said flyweights will then swing out and cause the sleeve 35 to rise from its lowermost position against the shoulder 51 on the shaft 29 by compressing spring 36 and to take up the position shown in Fig. 4. This movement causes the control lever 38 to rock about the pin 40 and to displace the operating member 24 of the control valve. In the new position of the latter the piston 26 releases communication between the working space 13 and the adjacent open end of the cylinder 14 through passage 18 and chamber 16 and, at the same time, holds chamber 16 out of communication with the fluid pressure supply pipe 2. Simultaneously, the piston 25 shuts off communication between the chamber 15 and the adjacent open end of the cylinder 14 and, further, brings the fluid pressure supply pipe 2 through passage 19, chamber 15 and passage 17 into communication with the working space 12.

The piston 9 is now subjected to a difference of pressure which displaces the same toward the working space 13 (Fig. 5). This movement is transmitted to the regulating lever 4 which is thus pivoted back about the pin 5 to bring the regulating rod 1 again into a position wherein no fuel or only a considerably reduced quantity thereof is supplied to the engine. At the same time the pin 41 is displaced together with the bell-crank lever 42, whereby pin 47 of the latter slides back on the guide fork 48. The bell-crank lever entrains by means of the pin 44 and the link 45, the control lever 38 and turns the same about its end 50, whereby the operating member 24 of the control valve is returned to its mid-position to arrest any further movement of the piston 9.

The regulating rod 1 is hereby kept in the position for reduced fuel supply until the speed of the engine has dropped so far that the spring 36 overcomes the centrifugal force of the weights 30 thus causing the governor sleeve 35 to return to its seat 51 on the shaft 29. The parts of the regulating device then retake again the position shown in Fig. 2 from which position any further displacement to the position of Fig. 3 takes place in the way already described.

Reduction of fluid pressure supply can also be operated by the attendant when starting from the position of Fig. 3. For this purpose the shaft 49 has to be turned together with the guide fork 48 toward the position shown in Fig. 1. This results in the bell-crank lever 42 being rocked about the pin 41. When the position of the centrifugal governor remains unaltered, also the control lever 38 will be rocked about its end 50, and the operating member 24 of the control valve will be brought into the position shown in Fig. 4. The piston 9, of the servomotor, the regulating lever 4 and regulating rod 1 as well as the control lever 38 and the operating member 24 of the control valve are then moved toward the position shown in Fig. 1, thereby reducing the fluid pressure supply to the engine. This mode of governing is not represented in detail in the drawings.

The regulating device represented in Figs. 6 to 16 may be used for the same purpose as has been described relative to Figs. 1 to 5, with the advantage, however, that it permits a closer arrangement of parts employed.

The numeral 1 designates again for example the regulating rod of a fuel injection apparatus of an internal combustion engine; the displacement of said rod to the left in the drawing reduces the fuel supply to the engine while, likewise, said fuel supply is increased upon displacement to the right of said rod.

The rod 1 is pivoted by means of a pin 3 to a regulating lever 52 which serves the same purpose as the regulating lever 4 in the preceding example. It is freely revoluble on a shaft 53 rotatably supported in the casing 54; the axis 55 of said shaft is, therefore stationary relatively to said casing. As in the preceding example, the opposite end of the regulating lever is provided with a longitudinal slot 6 adapted to engage a pin 7 carried by the rod 8 of the working piston 9 of a servomotor. The said piston is shown operating in the cylinder 10 wherein it separates the working spaces 12 and 13.

In contradistinction to the arrangement shown in Figs. 1 to 5, the valve cylinder 56 in the casing 57 is shown extending perpendicularly to the cylinder 10 of the servomotor. It has only one open end and presents three portions of larger diameter forming chambers 58, 59 and 60, respectively. The chambers 58 and 60 and the closed end 61 of the cylinder communicate through passages 62 with the atmosphere. The intermediate chamber 59 is connected by means of a passage 66 to the pressure fluid supply pipe not shown, said pipe being identical with the pipe 2 in the first embodiment described. The portions of the cylinder 56 lying between the chambers 58 and 59 and between the chambers 59 and 60 are shown communicating through passages 67 and 68, respectively, with the working spaces 13 and 12 of the cylinder 10.

The numeral 69 designates the operating member of the control valve comprising in this instance three pistons 70, 71 and 72 conforming to and operating with a tight fit in the narrow shaped portions of the cylinder 56. The length of said pistons and the distances therebetween correspond exactly to the length and distances of the chambers 58, 59 and 60, respectively.

The centrifugal governor is of the same construction as in the first embodiment described, its parts being, therefore, designated by the same reference characters employed in Figs. 1 to 5. The governor sleeve 35 is provided with a peripheral slot 37 adapted to engage a pin 73 fast on the end of a floating control lever 38. The operating member 69 of the control valve is pivoted by means of a pin 39 to the control lever 38.

According to the present arrangement an eccentric 74 is provided to fulfill the purpose of pin 41 carried by the regulating lever 4 in Figs. 1 to 5, said eccentric being formed as an integral part of the regulating lever 52 and having its axis at 75; the working surface 76 of said eccentric surrounds the axis 55 of the shaft 53 for the bell-crank lever 42 in Figs. 1 to 5 is substituted, in the present instance, an intermediate piece 77, which is shown having a bush-shaped portion 78 mounted for rotation on the eccentric 74 about the axis 75 thereof, and a hollow pin-like extension 79 forming a passage for the shaft 53 and corresponding to the pin 44 of the first embodiment described. The axis 80 of said pin-like extension is parallel to the axis 75 of the eccentric 74. The parts 78 and 79 of the intermediate piece 77 are connected to each other by means of a shoulder 81 having an ear 82 which corresponds to the arm 46 of the bell-crank lever 42 in the first embodiment. The said ear carries a pin 83 acting as a support for a two branched guide fork 84 which extends through a slot into the cavity of the hollow extension 79 to embrace two parallel plane guiding surfaces 85 on the shaft 53; the said fork is thus coupled for rotation with the shaft 53 and, nevertheless, can be displaced perpendicularly to the axis 55 of said shaft. In this way, the pin 83, or the attachment point of said pin on the intermediate piece 77 is guided on a determined path which may be displaced by rotating shaft 53. Pin 83 thus corresponds to pin 47 in the first embodiment. The extremity of the shaft 53 carries outside the casing 54 a lever 86 having thereon a pin 87 upon which may be applied a gear (not shown) for operation by the attendant.

The pin-like extension 79 is shown supporting a link 45 pivoted by means of a pin 40 to the control lever 38. Between the pin 79 and the casing 54 is interposed a distance plate 88 seated on the shaft 53 and preventing the link 45 from axial displacement on the pin 79.

Figure 7:
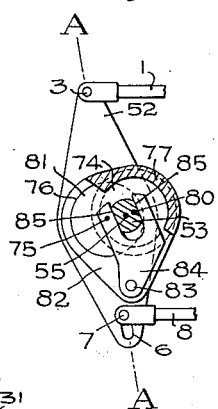
Figure 8:
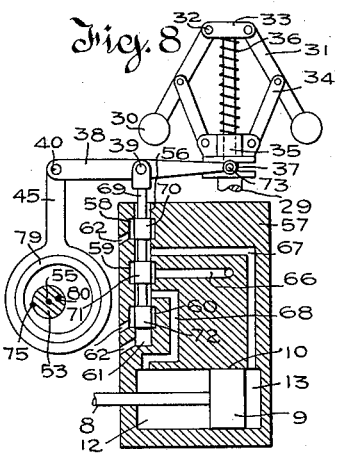

Figs. 7 and 8 show the device at rest. The regulating rod 1 is in a position wherein fuel supply to the engine is stopped, and the relative positions of the regulating lever 52, the eccentric 74, the rod 8 and the piston 9 of the servomotor are then positively determined.

Also the shaft 53 is in its normal position to which it has been turned by the attendant by means of the lever 86. The position of the intermediate piece 77 and its pin-like extension 79 as well as the position of the link 45 and the pin 40 is thus positively determined by the eccentric 74 and the path on which pin 83 guided by the fork 84 is moving when the shaft 53 is at rest. The spring 36 then holds the governor sleeve 35 firmly applied against the shoulder 51 on the shaft 29. In the position shown of the control lever 38, which is determined by the position of the governor sleeve 35 and pin 40, the operating member 69 of the control valve is in its mid-position, wherein the pistons 70, 71 and 72 extend over the whole length of the chambers 58, 59 and 60; the communications between said chambers and the intermediate portions of the valve cylinder 56 are thus all shut off to the same degree, and the working spaces 12 and 13 of the servomotor are out of communication with either the pressure fluid supply 66 and the outlet passages 62.

Figure 9:
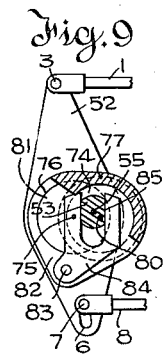
Figure 10:
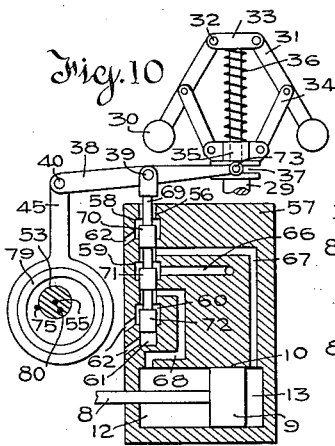

To start the engine the shaft 53 is turned by means of the lever 86 into the position shown in Figs. 9 and 10; this rocking movement has at first no effect upon the positions of the regulating rod 1, regulating lever 52, eccentric 74, rod 8 and piston 9 of the servomotor. Rocking of the shaft 53 is, however, imparted through the guide fork 84 and pin 83 to the intermediate piece 77 and the eccentric 74. This results in the extension 79 being rocked into a new position. Owing to the link 45, the control lever 38 is rocked about the follower pin 73 so as to bring the operating member 69 of the control valve into the position shown in Fig. 10 wherein communication between passage 67 and chamber 58 is shut off by the piston 70. At the same time the piston 71 releases communication between chamber 59 and passage 67, to permit flow of pressure fluid from the passage 66 into the working space 13, while chamber 59 and passage 68 are still out of communication. Finally, the piston 72 releases discharge from the working space 12 through the latter of said passages toward the chamber 60 which communicates through one of the passages 62 with the outside.

Figure 11:
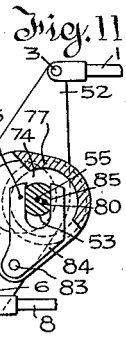
Figure 12:
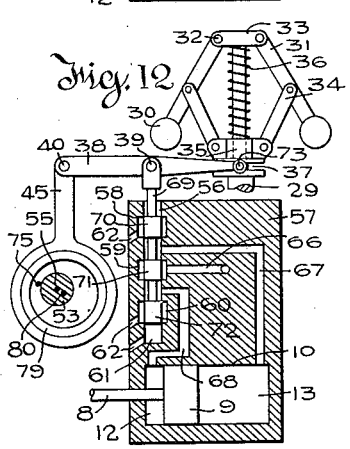
Figure 13:
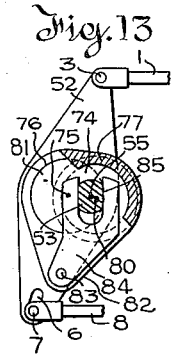

The fluid pressure entering the working space 13 displaces the piston 9 toward the position shown in Fig. 12. This movement causes a rocking of the regulating lever 52 on the shaft 53 and through said lever a displacement of the regulating rod 1 in such way as to increase the supply of fuel to the engine. The rocking of the lever 52 is also transmitted to the eccentric 74 which causes displacement of the intermediate piece 77, whereby the path of the pin 83 is determined by the fork 84 which is guided by the guiding surfaces 85 on the shaft 53. Accordingly, the displacement of the extension 79 acts upon the control lever 38 which is turned back by means of the link 45 so as to return the operating member 69 of the valve again to its mid-position. When this position has been attained the piston 9 of the servomotor and the regulating rod 1 will not be moved any further (Figs. 11 and 12).

Figures 14, 15:
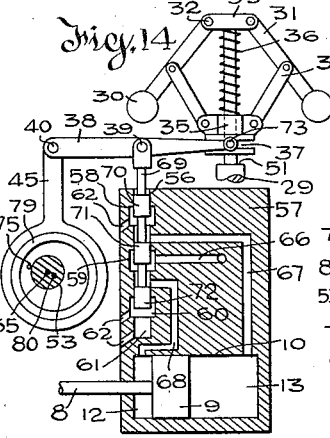

It will be seen that when the speed of the engine exceeds a determined value, the flyweights 30 act by centrifugal force upon the governor sleeve 35 against spring 36 so as to remove said sleeve from the shoulder 51 on the shaft 29, the control lever 38 being thus rocked about pin 40 (Fig. 14). Consequently the operating member 69 of the control valve is displaced in such way as to allow the piston 70 to establish communication between passage 67 and chamber 58 for releasing the escape from the working space 13 toward the outside. At the same time, piston 71 provides for communication between chamber 59 into which fluid pressure supply 66 is leading and passage 68 opening into the working space 12; the piston 71 prevents also flow of fluid from the chamber 59 into the passage 67, while simultaneously piston 72 shuts off communication between passage 68 and chamber 60.

Figure 16:
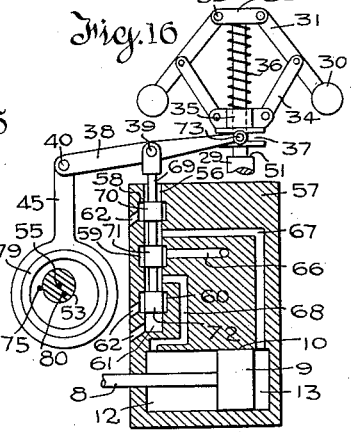

Owing to the fluid pressure supplied to the working space 12 of the servomotor the piston 9 is then displaced in such way as to reduce by means of the rod 8, regulating lever 52 and regulating rod 1 the supply of fuel to the engine (Figs. 15 and 16). The regulating lever 52 thereby turns about the shaft 53 and its eccentric 74 operates the displacement of the intermediate piece 77 and through the extension 79 the displacement of link 45. Simultaneously, the control lever 38 turns about the follower pin 73 thereby returning the operating member of the control valve to its mid-position. When this position has been attained supply of fuel to the engine will not be reduced any further. Finally, when the speed of said engine has been reduced so far as required to permit returning of the governor sleeve 35 to its seat 51, the parts shown of the regulating device will be displaced toward the position of Figs. 9 and 10 and afterwards toward the position of Figs. 11 and 12.

While the represented examples show some preferred forms of the invention, it is understood that other constructions and combinations of parts may be made which fall within the scope of the appended claims.

I claim:

1. The combination of a regulating member adapted for connection with an energy input controller for a prime mover; a centrifugal governor adapted to be driven by said prime mover; a servomotor connected to actuate said regulating member and including a distributing valve which controls the motion of the servomotor; a floating control lever connected with said distributing valve and with said governor; a motion combining element hinged to said regulating member and connected with said control lever; and an angularly adjustable guide determining the direction of motion of a portion of said motion combining element, said motion combining element and the control lever together comprising a follow-up mechanism between the servomotor and its value under control of the governor, and the angular adjustment of said guide serving to vary the positional relation between the regulating member and the governor and also the motion ratio between the servomotor and its distributing valve.

2. The combination of a regulating lever adapted for connection with an energy input controller for a prime mover, said regulating lever being fulcrumed on a fixed axis; a centrifugal governor adapted to be driven by said prime mover; a servomotor connected to move said regulating lever and including a distributing valve which controls the motion of the servomotor; a floating control lever connected with said distributing valve and with said governor; a motion combining element hinged to the regulating lever on an axis parallel with said fixed axis and connected with said control lever; and a guide for determining the direction of motion of a portion of said motion combining element, said guide being angularly adjustable about an axis parallel with said fixed axis, said motion combining element and the control lever comprising a follow-up mechanism between the servomotor and its valve under control of the governor and the angular adjustment of said guide serving to vary the positional relation between the regulating lever and the governor and also the motion ratio between the servomotor and its distributing valve.

3. The combination of a regulating lever adapted for connection with an energy input controller for a prime mover, said regulating lever being fulcrumed on a fixed axis; a centrifugal governor adapted to be driven by said prime mover; a servomotor connected to move said regulating lever and including a distributing valve which controls the motion of the servomotor; a floating control lever connected with said distributing valve and with said governor; a motion combining element hinged to the regulating lever on an axis parallel with said fixed axis and connected with said control lever; and a guide for determining the direction of motion of a portion of said motion combining element, said guide being angularly adjustable about said fixed axis, said motion combining element and the control lever comprising a follow-up mechanism between the servomotor and its valve under control of the governor.

4. The combination of a regulating shaft rotatable through a limited angle; a guide carried by said shaft and extending transversely thereto; a regulating lever adapted for connection with an energy input controller for a prime mover, said lever being fulcrumed coaxially with said shaft and having an eccentric journal which encircles said shaft; a centrifugal governor adapted to be driven by said prime mover; a servomotor connected to swing said regulating lever through a limited angular range, said motor including a distributing valve which controls its motion; a floating control lever connected with said distributing valve and with said governor; a motion combining element swiveled on said eccentric journal and connected with said floating lever; and a member guided by said guide and hinged to said motion combining element, said motion combining element and the control lever together comprising a follow-up mechanism between the servomotor and its valve under control of the governor.

HESPER VON TAVEL.